United States Patent [19]

Barcelo Rubi

[11] 4,275,709
[45] Jun. 30, 1981

[54] SYSTEM OF SOLAR HEATING BY MEANS OF FAN RADIATORS WITH FLUID CIRCUIT AND WITHOUT STORAGE

[76] Inventor: Bartolomé Barcelo Rubi, Fray Luis Jaume Vallespir,1, Palma De Mallorca, Spain

[21] Appl. No.: 20,947

[22] Filed: Mar. 15, 1979

[30] Foreign Application Priority Data

Mar. 16, 1978 [ES] Spain .................................. 467.925

[51] Int. Cl.³ ............................................. F24J 3/02
[52] U.S. Cl. .................................... 126/422; 126/427; 237/8 C
[58] Field of Search ............... 126/422, 427, 428, 430, 126/419; 237/8 R, 8 C; 219/279

[56] References Cited

U.S. PATENT DOCUMENTS

| | | | |
|---|---|---|---|
| 3,977,601 | 8/1976 | Bearzi | 126/422 |
| 3,996,759 | 12/1976 | Meckler | 126/422 |
| 4,153,104 | 5/1979 | Ruder | 126/422 |

Primary Examiner—Albert J. Makay
Assistant Examiner—Henry Bennett
Attorney, Agent, or Firm—Wenderoth, Lind & Ponack

[57] ABSTRACT

A system of solar heating by means of fan radiators with a fluid circuit and without storage includes solar panels or collectors connected in series. The solar circuit feeds a heat exchanger, the fluid being propelled through the circuit by a pump. The solar circuit is electronically controlled by an electronic panel, the start-up or shut-off of which is determined by temperature differential sensors. When the solar circuit is activated, the transmission of heat is effected by means of the heat exchanger from which the absorbed solar heat energy is transferred to a heating circuit, and when the solar circuit has reached its stabilization point and its temperature has increased to a predetermined value, a contact thermostat activates a heating circulating pump which circulates a fluid through the fan radiators.

4 Claims, 1 Drawing Figure

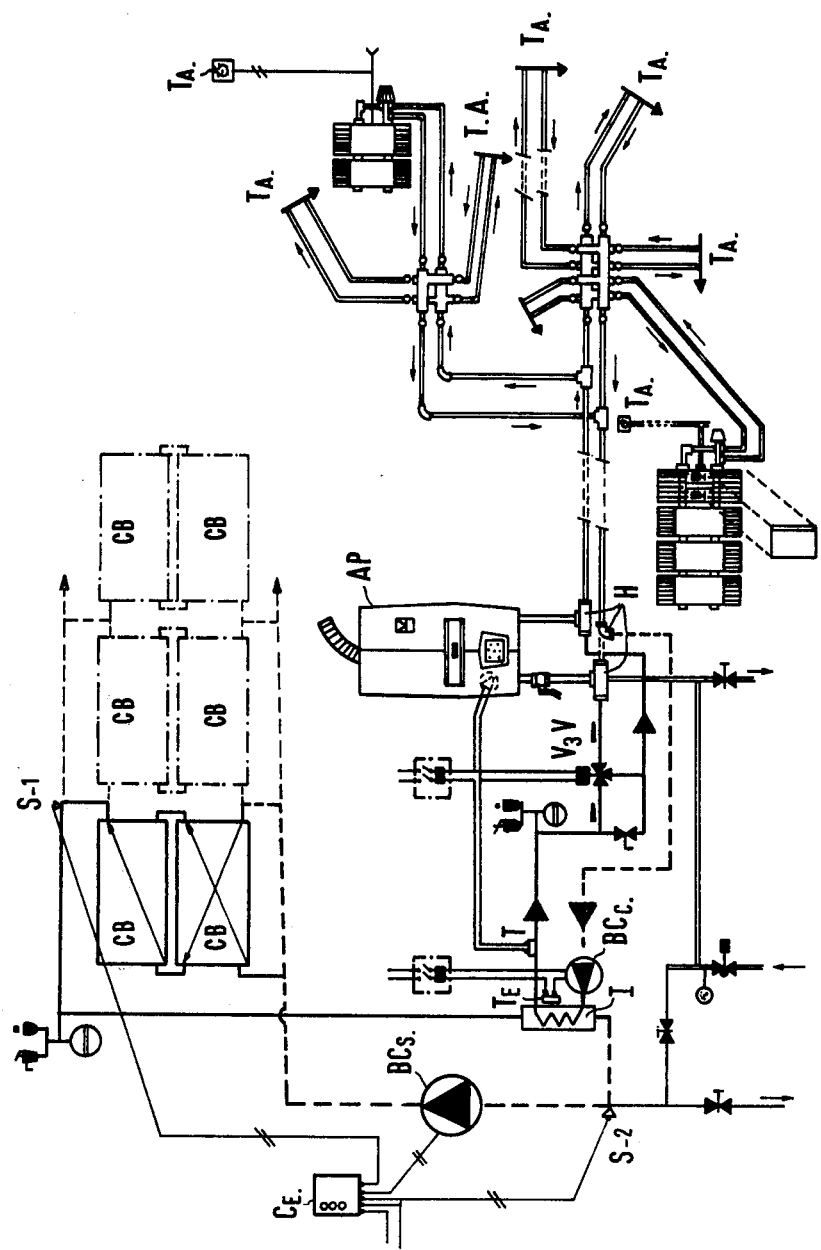

SYSTEM OF SOLAR HEATING BY MEANS OF FAN RADIATORS WITH FLUID CIRCUIT AND WITHOUT STORAGE

BACKGROUND OF THE INVENTION

The invention relates to a solar heating system for utilizing solar energy for space heating an inside area such as a residence or office building. More particularly, the invention relates to a solar heating system utilizing two closed loop fluid transfer circuits thermally connected by means of a heat exchanger and utilizing fan radiators having dual mode (forced air or natural convection) capability.

SUMMARY OF THE INVENTION

The object of this invention is the utilization of solar radiation for heating. Fan-type radiators capable of operating in a dual mode capability (i.e., forced air circulation and natural convection), are utilized; the use of such dual mode radiators enabling a saving estimated at more than 40% in comparison with an installation utilizing conventional radiators; one of the main advantages of dual mode radiators being the possibility of eliminating a heat storage installation by substituting instead specifically designed compensation support.

BRIEF DESCRIPTION OF THE DRAWINGS

Further characteristics and advantages of the present invention will be more evident from the detailed description provided hereinafter with reference to the accompanying drawing which illustrates in detail both the mechanical and electrical configuration of the elements of an embodiment of the present invention.

DESCRIPTION OF THE PREFERRED EMBODIMENT

A system in accordance with the present invention consists of the following:

(a) The use of a fan radiator in the room to be heated, which independently performs the functions of a natural convection radiator or of a forced air fan radiator; the latter function or mode effected by the use of a thermostatic control for controlling the operation of the fan in response to temperature and control switch setting.

(b) For a greater degree of flexibility and to maximize the use of solar energy, the radiator will be regulated to enable operation at an initial low solar collector temperature of 40° C.

(c) For an even greater saving of energy, the modular system in accordance with the present invention utilizes four-way valves in each fan radiator, which makes it possible to individually shut off the circulation of any fluid radiator without any effect on the fluid flow from the circuit accelerator pump, and to equalize the temperature in all of the radiator elements.

Since the saving represented by this system is of the order of 40% compared with conventional systems, because of the desired fluctuation in day and night area temperatures due to the stopping of the radiator fans, with a consequent saving of 60% of the radiation potential, and in order to reduce the cost of the system installation, storage devices have been eliminated (although they are adaptable to the system), and substituted a simple energy support system having multiple and varied forms. This energy support is provided by a boiler AP, and is thermostatically controlled such that it will be in operation when the temperature of the fluid circulated through the heat exchanger I from the solar circuit is below a predetermined level. If there is no solar radiation available, the heat exchanger element will remain shut off since the system is arranged such that the temperature sensor $S_2$ attached to the heat exchanger solar fluid return is at a temperature which is lower by a predetermined value in relation to the temperature read by sensor $S_1$ directly attached to the solar collector fluid line.

The functioning of the system is initiated with the increase of the temperature of the solar circuit which is sensed by a thermostat TE placed in the heat exchanger I which typically operates at 30° C. and electrically feeds the following:

(a) Each of the ambient thermostats TA of the fan radiators, whose connections can be independent;

(b) The accelerator pump of the solar heating circuit $BC_c$.

(c) The three-way servo operated valve V3V, activated by the thermostat T in relation to heating and support, in which case we shall have the following system operation:

(1) Start-up of each radiator fan whose connection to its thermostat TA is effected by the independent control of its control switch;

(2) Operation of the accelerator pump of the solar heating circuit $BC_s$;

(3) Diversion of part of the flow in the three-way valve V3V towards the support boiler AP and the remainder of the flow by a by-pass line; the valve and boiler being controlled by the thermostat T in a low temperature situation when the fluid temperature is below a predetermined value; and (4) Initiation of a process of fluid temperature increase by means of the support boiler AP.

Assuming a difference in temperature of 10° C. in the heat exchanger circuit (i.e., a 10° C. heat transfer loss), and a fluid temperature of 40° C. reaching the thermostat T when the solar collector temperature is 50° C., the heat exchange will be controlled by H to effect heating by the solar collector circuit. If the solar collector circuit does not have the predetermined minimum fluid temperature necessary for effective operation, the boiler AP will continue to operate until the transferred solar collector temperature is higher than the maximum programmed temperature of 40° C.

If the boiler AP is made inoperative during the solar period we shall have entirely solar heating beginning typically at a 50° C. fluid temperature.

The solar circuit consists of solar panels or collectors CB connected in series (see drawings) with an area typically of approximately 2.60 square meters; the solar circuit of the panels feed the heat exchanger I. The means used for transporting this heat energy is an accelerator pump $BC_s$ which causes the fluid that transports the heat energy to circulate through the circuit. The entire solar system is automatically controlled by an electronic panel CE activated by sensors $S_1$ and $S_2$. This solar circuit is typically activated when the difference in temperatures is higher than 40° C., which is the operative temperature at a low heating temperature.

Having set up the solar circuit we have the transmission of heat by means of the heat exchanger I. From this exchanger I the heat is transferred to the heating circuit.

At the moment when the solar circuit has established its functioning and the temperature has undergone an increase to 40° C. typically, a contact thermostat T starts up the heating circulation pump $BC_c$. When this circulation by $BC_c$ is in effect, if another contact thermostat T does not sense a fluid temperature as high as 40° C. typically, a powerdriven three-way valve V3V is operated to divert part of the circulating fluid through the support boiler AP in order to raise the temperature in the water heating circuit to 40° C. minimum necessary for efficient system functioning.

When the support boiler AP has effected an increase in the fluid temperature in the heating circuit to its minimum value, thermostat T disconnects the valve V3V and diverts all of the fluid through the heating circuit directly without going through the support boiler AP. This is because if there is a sufficient increase of heat transmission or a rise in temperature has been achieved through the solar heat exchanger I, the system operates only with the solar collector circuit and needs no supplementary heat source.

In the heating circuit piping is arranged in a modular configuration by modules, in which the connections to the different fan radiators are made in the same way to achieve temperature equalization therebetween. Each fan radiator situated in a room or zone has a four-way valve which permits the complete shut-off of all the radiators in that room or zone without varying the load conditions on the heating circuit accelerator pump $BC_c$.

Each of the fan radiators in a room or zone is activated automatically by an ambient thermostat TA having a separate shut-off or start-up switch. The use of separate thermostats eliminates a serious disadvantage of conventional heating installations, wherein the temperature of the whole house is controlled by one ambient thermostat. In this way individualized control of the temperature of areas or rooms of each dwelling is achieved by means of separate heating controls. The use of separate controls obviate heating problems by enabling the division of a dwelling into day zones and night zones, the latter covering bedrooms and bathrooms. In the case of night usage of a room or area, the operating switch of its ambient thermostat TA for the area or room is set to enable the heating of the room by forced air circulation. At such a switch setting, the radiator is performing at 100% of its heat transfer potential, achieving automatic operation by means of the thermostat TA. When the operating switch is off for non-utilized areas or rooms, the functioning of the radiator is reduced to 40% of its forced air capability and operates by natural convection so that the temperature of the room is reduced. When the non-utilized room temperature is lowered, the reduced difference in temperature between the external temperature and the temperature of the room reduces the heat loss through the walls. The forced air system also causes a layer of heat on the surface of the walls of the room, which produces a kind of thermal insulation.

This installation makes it possible to avoid having to install a tank or a large facility for storage of heat, a disadvantage that occurs on a great many occasions and most specifically in domestic installations and which does not result in a saving of energy except at a large increase in the cost of the solar circuit.

A sufficient description having been given of all of the elements of the system that is the subject of this invention, it only remains to state that the accessory details relating to materials, size, and form may be varied, provided that these possible alterations do not affect its essence, which is reflected in the following claims:

The points claimed in this invention are:

1. A solar heating system comprising first and second closed loop fluid circuit thermally connected by means of a heat exchanger;
    said first fluid circuit comprising:
        at least one solar collector for heating the fluid in said first circuit with the energy absorbed from solar radiation,
        a first fluid pump for circulating the fluid in said first circuit,
        a first temperature sensor for measuring the temperature of the first circuit fluid at the at least one solar collector and a second temperature sensor for measuring the first circuit fluid temperature at the heat exchanger,
        a first control means operatively connected to said first and second temperature sensors and said first fluid pump for activating said first fluid pump when the difference between the temperature measured by said first temperature sensor and the temperature measured by said second temperature sensor exceeds a predetermined value;
    said second fluid circuit comprising:
        at least one radiator for transferring the heat energy contained in the fluid in said second circuit to the air adjacent said at least one radiator,
        a second fluid pump for circulating the fluid in said second circuit,
        a third temperature sensor operatively connected to a second control means and said second fluid pump, said third temperature sensor thermally connected to said heat exchanger, said second control means activating said second fluid pump when the temperature measured by said third temperature sensor exceeds a predetermined value,
        an auxiliary fluid heater for heating said second circuit fluid,
        a fourth temperature sensor for sensing the second circuit fluid temperature at said heat exchanger,
        a valve means for selectively controlling the flow of the second circuit fluid path,
        a third control means operatively connected to said fourth temperature sensor, valve means, and auxiliary fluid heater, wherein said third control means actuates said valve means such that the path of said second circuit fluid is diverted by said valve means so as to by-pass said auxiliary fluid heater when the temperature measured by said fourth temperature sensor exceeds a predetermined value and wherein said valve means is actuated by said third control means to enable said second circuit fluid to flow through said auxiliary heater and said auxiliary heater is controlled by said third control means to increase said second circuit fluid temperature when the temperature measured by said fourth temperature sensor is below a predetermined value.

2. The solar heating system of claim 1 further comprising a four-way valve for each of said at least one radiators, said four-way valve operatively connected in said second fluid circuit between said at least one radiator and said second fluid pump,
    an additional temperature sensor for each of said four-way valves, operatively connected to its respective four-way valve for controlling its respective four-way valve in response to the ambient air temperature measured by said additional temperature sensor, wherein each four-way valve is operated to divert said second circuit fluid to by-pass its respective radiator when said ambient temperature measured by its respective additional temperature sensor exceeds a predetermined value and wherein each diverted path has the same fluid resistance as that of its respective radiator.

3. A solar heating system as in claim 2, wherein each of said at least one radiators further comprises a fan operatively connected to its respective additional temperature sensor and a respective switch means, each switch means disabling its respective fan when said switch means is in a first position and enabling its respective fan to be operated by its respective additional temperature sensor when said switch means is in its second position, whereby said at least one radiator operates as a natural convection radiator when its respective switch means is in its first position and operates as a forced air radiator when its respective switch means is in its second position.

4. A solar heating system as in claim 1, wherein each of said at least one radiators further comprises:

a valve operatively connected in said second fluid circuit between its respective radiator and said second fluid pump, an additional temperature sensor for each of said valves, operatively connected to its respectve valve for controlling its respective valve in response to the ambient air temperature measured by said additional temperature sensor, wherein each valve is operated to divert said second fluid circuit to by-pass its respective radiator when said ambient temperature measured by its respective additional temperature sensor exceeds a predetermined value, and wherein each of said at least one radiators further comprises a fan operatively connected to its respective additional temperature sensor and a respective switch means, each switch means disabling its respective fan when said switch means is in a first position and enabling its respective fan to be operated by its respective additional temperature sensor when said switch means is in its second position, whereby said at least one radiator operates as a natural convection radiator when its respective switch means is in its first position and operates as a forced air radiator when its respective switch means is in its second position.

* * * * *